United States Patent [19]
Abe et al.

[11] Patent Number: 5,577,810
[45] Date of Patent: Nov. 26, 1996

[54] WHEEL DISK HAVING A NON-UNIFORM THICKNESS

[75] Inventors: Kishiro Abe; Mitsuru Itoh, both of Ayase, Japan

[73] Assignee: Topy Kogyo Kabushiki Kaisha, Tokyo, Japan

[21] Appl. No.: 527,428

[22] Filed: Sep. 13, 1995

[30] Foreign Application Priority Data

Mar. 18, 1994 [JP] Japan ..................... 6-48725

[51] Int. Cl.⁶ .................................................. B60B 3/04
[52] U.S. Cl. ........................... 301/63.1; 29/894.323
[58] Field of Search ................. 301/63.1; 29/894.322, 29/894.323, 894.324, 894.325, 894.332; 72/84

[56] References Cited

U.S. PATENT DOCUMENTS

| | | | |
|---|---|---|---|
| 1,812,437 | 6/1931 | Hunt | 29/894.323 X |
| 2,975,511 | 3/1961 | Johnson | 29/894.325 |
| 3,262,191 | 7/1966 | Abertson et al. | 29/894.325 |
| 3,391,439 | 7/1968 | Bulgrin et al. | 29/894.325 |
| 3,411,334 | 11/1968 | Ernestus | 72/84 X |
| 3,442,110 | 5/1969 | Walton et al. | 29/894.325 X |
| 3,612,614 | 10/1971 | Ware | 301/63.1 |
| 3,823,591 | 7/1974 | Schroder . | |
| 5,219,441 | 6/1993 | Utykanski et al. | 301/63.1 |

FOREIGN PATENT DOCUMENTS

| | | |
|---|---|---|
| 1964393 | 6/1970 | Germany . |
| 2026838 | 12/1971 | Germany . |
| 2301760 | 7/1974 | Germany . |
| 57-94504 | 6/1982 | Japan . |
| 57-94505 | 6/1982 | Japan . |
| 60-111702 | 7/1985 | Japan . |
| 62-6111 | 1/1987 | Japan . |
| 3-11901 | 2/1991 | Japan . |
| 2025333 | 1/1980 | United Kingdom . |

OTHER PUBLICATIONS

European Search Report, Feb. 21, 1996.
Patent Abstracts of Japan, vol. 8, No. 128 (M–302), 14 Jun. 1984 & JP–A–59 030437, 18 Feb. 1984.

*Primary Examiner*—Russell D. Stormer
*Attorney, Agent, or Firm*—Cushman, Darby & Cushman; IP Group of Pillsbury Madison & Sutro LLP

[57] ABSTRACT

A disk having a non-uniform thickness with a thickness of an end portion thereof being smaller than a thickness of a hub coupling portion and a thickness of a hat portion being smaller than the thickness of the end portion. As a result, rigidity of the hat portion is decreased so that stress distribution in the disk is uniform and excess stress concentration is prevented from influencing a weld portion. Further, because of the decrease in thickness, weight of the disk also is decreased as compared to conventional disks.

8 Claims, 4 Drawing Sheets

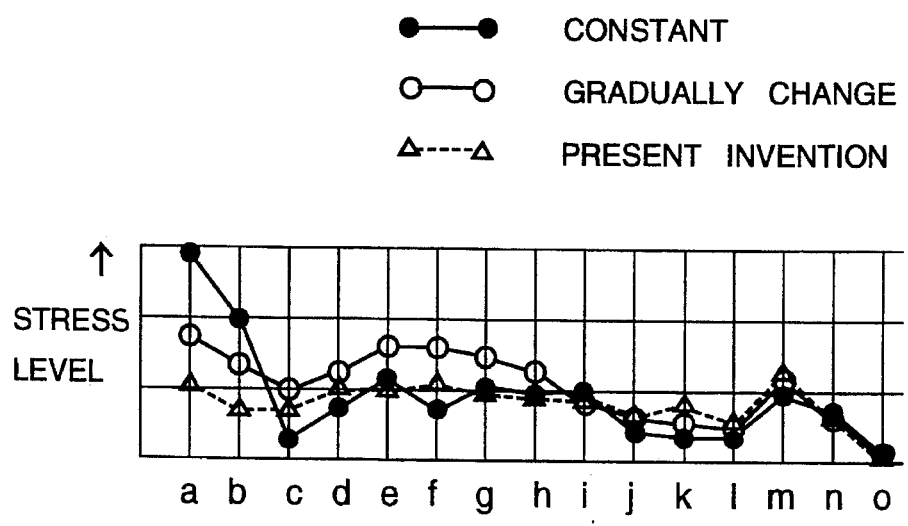

| No. | 1 | 2 | 3 | 4 | 5 |
|---|---|---|---|---|---|
| STEP | MATERIAL | BLANKING | DRAWING | DIE-CUTTING | DRILLING |
| DEVICE |  | PRESS | PRESS | PRESS | MULTIPLE DRILL |

WHEEL DISK HAVING A NON-UNIFORM THICKNESS

BACKGROUND OF THE INVENTION

1. Field of the Invention

The present invention relates to a wheel disk for an automobile.

2. Description of Related Art

As illustrated in FIG. 7, a wheel is a welded assembly of a dish-like disk 1 and an annular rim 2. A disk for a large-sized wheel such as wheels for busses and trucks, made according to the process of FIG. 8, is manufactured by the steps of die-cutting a circular blank 4 from a square flat plate 3 (step 2), drawing the blank 4 into the form of a disk configuration by a press (step 3), perforating a hub hole and decoration holes by a press (step 4), and drilling nut holes by a multiple drill and machining nut seats (step 5). The thus constructed disk manufactured from a flat plate has a substantially uniform thickness as shown in FIG. 7.

Alternatively, a disk may be formed to a disk configuration through cold spinning so as to have a thickness gradually decreased from a hub coupling portion to a disk end portion. In the case of a gradually changing thickness, it has been thought to be preferable that the thickness of the disk end portion should be decreased to one half of the original thickness of the plate.

However, according to a stress analysis of a disk wheel conducted using a finite element method, it is clear that the stress distributions of the conventional disk having a substantially uniform thickness and the conventional disk having a gradually decreased thickness are not ideal. As a result, a relatively large stress concentration is caused at a weld portion connecting the disk end portion and the rim, and a portion of the disk is thicker than needed to be accompanied by an increase in weight.

SUMMARY OF THE INVENTION

An object of the invention is to provide a disk improved in stress distribution thereby improving the fatigue strength of the disk and enabling a decrease in weight of the disk.

The disk includes a hub coupling portion disposed perpendicular to an axis of the disk. The hub coupling portion is coupled to a curved portion, which in turn is coupled to a hat portion, which is coupled to an end portion. The end portion is formed to have a thickness greater than that of the hat portion and less than that of the hub coupling portion.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which:

FIG. 5 is a graph showing a stress distribution in the disk of FIG. 4;

FIG. 6 is a block diagram illustrating steps for manufacturing the disk having a non-uniform thickness according to the present invention including the step of cold spinning;

DETAILED DESCRIPTION OF THE PREFERRED EMBODIMENTS

Figure 1:
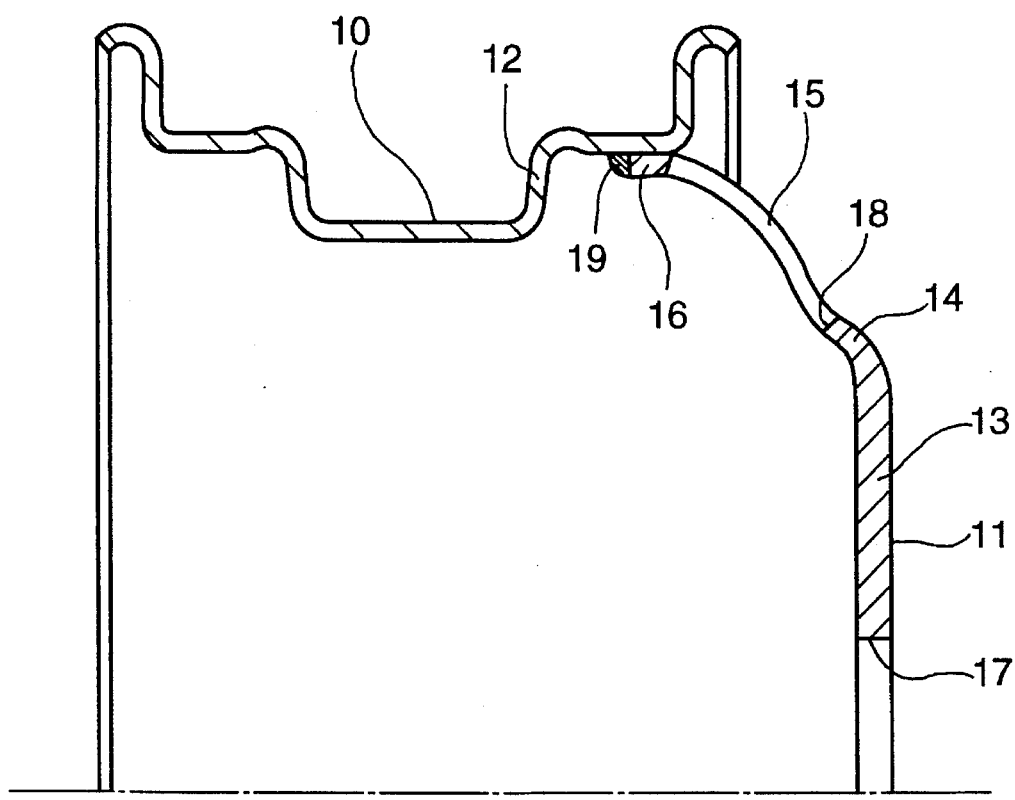
FIG. 1 is a partial cross-sectional view of a wheel which includes a disk having a non-uniform thickness according to one embodiment of the present invention.

As illustrated in FIG. 1, a wheel 10 includes an annular rim 12 having a rim configuration and a disk 11 having the form of a disk inserted in and welded to the rim 12 at a disk end.

The disk 11 includes a hub coupling portion 13, a curved portion 14, a hat portion 15, and an end portion 16. The hub coupling portion 13 extends perpendicularly to a disk axis (i.e., a wheel axis). The curved portion 14 is integrally connected to the hub coupling portion 13 and curves radially outwardly and axially inwardly at a radius. The hat portion 15 is integrally connected to the curved portion 14 and curves radially outwardly and axially inwardly at a radius greater than the radius of the curved portion 14. The end portion 16 is integrally connected to the hat portion 15 and extends axially inwardly and substantially in parallel with the disk axis. The rim 12 and the disk 11 are welded to each other at an end of the disk. Reference number 19 indicates the weld.

Figure 2:
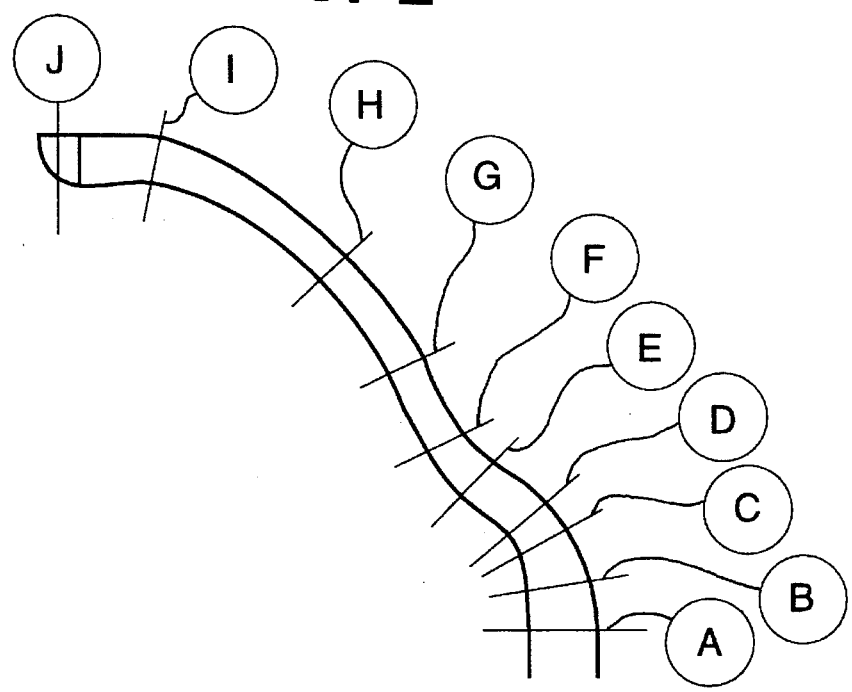
FIG. 2 is a partial cross-sectional view of the disk of FIG. 1 denoted with positional reference letters at respective positions of the disk.
Figure 3:
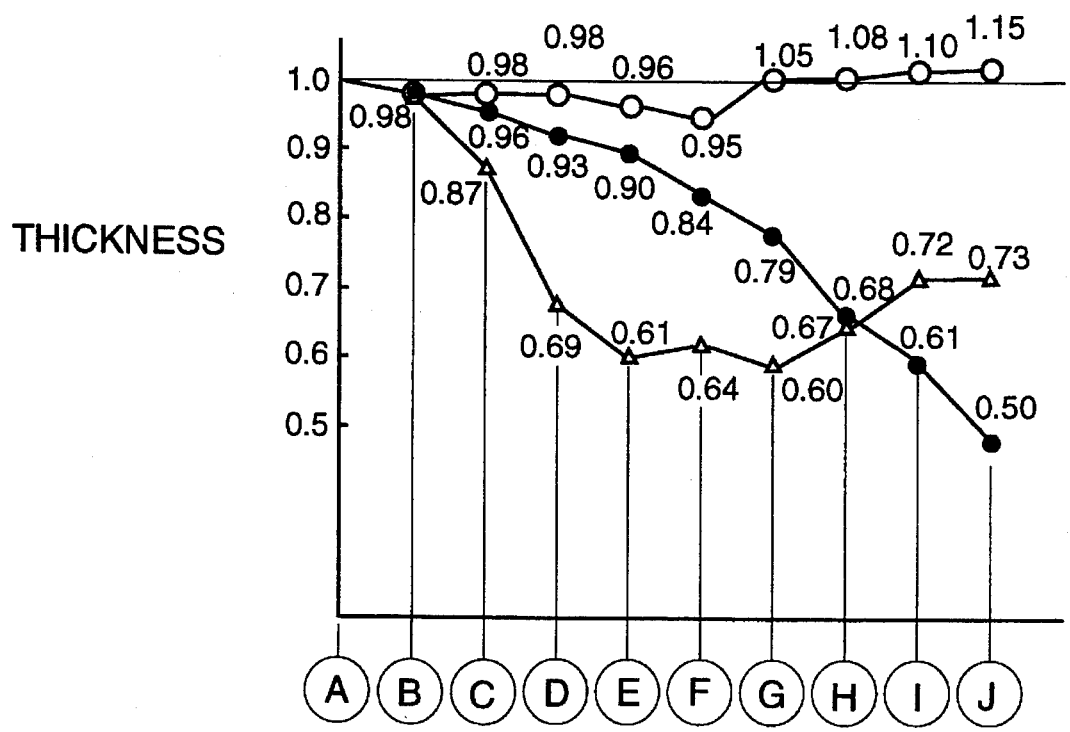
FIG. 3 is a graph showing a thickness distribution of the disk of FIG. 2.

A thickness distribution of the disk 11 is determined as shown in FIGS. 2 and 3, wherein positional reference characters A, B, C . . . J of FIG. 2 correspond to positional reference characters A, B, C . . . J of FIG. 3 placed along the x axis, respectively. As shown in FIGS. 2 and 3, the thickness of the hub coupling portion 13 is substantially uniform throughout the entire radial length of the hub coupling portion 13. The thickness of the end portion 16 is substantially uniform throughout the entire axial length of the end portion 16 but is smaller than that of the hub coupling portion 13. The thickness of the hat portion 15 is smaller than that of the end portion 16.

In greater detail, when the thickness of the hub coupling portion 13 is 1 (with units being arbitrary), the thickness of the end portion 16 is in the range of 0.8–0.65, and more preferably, in the range of 0.71–0.74. Further, when the thickness of the hub coupling portion 13 is 1 (units arbitrary), the thickness of the hat portion 15 is in the range of 0.5–0.7, and more preferably, in the range of 0.59–0.65. A portion of the hat portion 15 close to the end portion 16 is gradually increased in thickness toward the end portion 16 and is smoothly connected to the end portion 16. The curved portion 14 gradually decreases in thickness from the side of the hub coupling portion 13 toward the side of the hat portion 15 and is smoothly connected to the hat portion 15. As described above, the disk 11 has a non-uniform thickness.

As illustrated in FIG. 1, a hub hole 17 is perforated in a central portion of the hub coupling portion 13, and a plurality of decoration holes 18 are perforated in the hat portion 15 at a certain pitch in a circumferential direction of the disk. The wheel 10 is mounted to an axle shaft of an automobile at the hub hole and fixed to the axle. A tubeless tire is mounted to the rim 12.

As illustrated in FIG. 6, the disk 11 having a non-uniform thickness is manufactured by cold spinning. More particularly, a circular flat plate 21 is die-cut from a square flat plate 20 having a uniform thickness (step 2), and then the circular flat plate 21 is shaped to the form of a disk by cold spinning such that the formed disk has the thickness distribution described above (step 3). Then, the hub hole 17, nut holes 23, and the decoration holes 18 are perforated by die-cutting (step 4), and then the nut seats are machined in the nut holes 23 by a multiple drill (step 5). In the conventional cold spinning process, the disk is formed such that the thickness gradually decreases toward the end portion, but in the present invention, the thickness of the disk is smallest at the hat portion 15 and increases from the smallest thickness toward the end portion 16. Forming the disk in this manner is possible because of cold spinning.

If the above-described thickness condition is satisfied, the disk may be formed through a method other than cold spinning. For example, the disk may be formed by an oscillation forging. Alteratively, a circular flat plate having a non-uniform thickness is prepared and the plate may be formed to a disk by drawing using a press.

Figure 4:
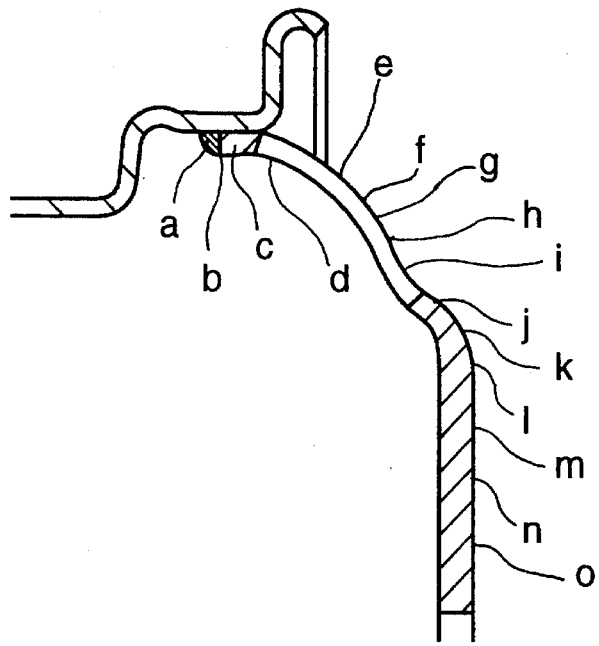
FIG. 4 is a partial cross-sectional view of the wheel of FIG. 1 denoted with positional reference characters at respective positions of the disk.
Figures 7, 8:
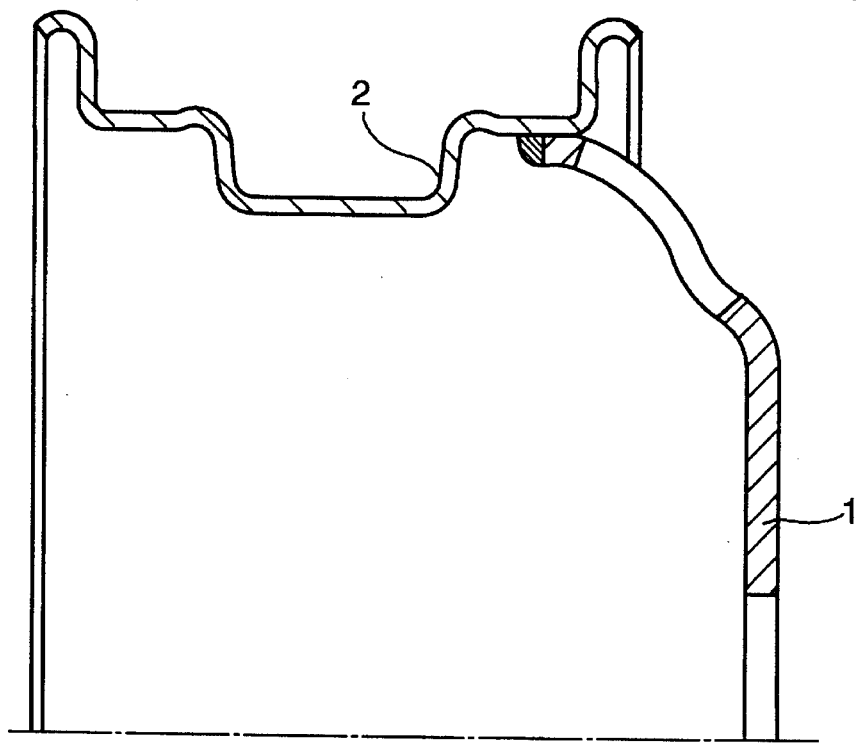
FIG. 7 is a partial cross-sectional view of a conventional disk having a uniform thickness.
FIG. 8 is a block diagram illustrating steps for manufacturing the conventional disk.

FIGS. 4 and 5 illustrate the stress distribution in the disk. Positional reference characters a, b, c . . . o of FIG. 4 correspond to those of FIG. 5 found on the x axis. For comparison, FIG. 5 shows a stress distribution of the conventional disk which has a thickness that gradually decreases toward the end portion.

As evident from FIG. 5, in the present invention, the stress caused in the end portion 16 is greatly decreased from both a disk of constant thickness and one where the thickness gradually decreases toward the end portion. Furthermore, in the present invention, the stress distribution is made substantially uniform throughout the entire portion of the disk. The stress caused in the end portion 16 of the disk of the present invention is about one third of that of the conventional disk having constant thickness. As a result, stress concentration at the weld portion is reduced so that cracks do not begin at the weld portion and crack propagation is greatly suppressed. Thus, the fatigue strength and life of the disk are improved. This is because the rigidity of the hat portion 15, which has a considerably high rigidity due to its curve, is decreased due to the decreased thickness of the hat portion 15, so that the hat portion 15 is more easily deformed than in the conventional disk thereby preventing deformation and stress from concentrating at the weld portion.

Because the hat portion 15 has a length greater than that of the end portion 16 and that of the curved portion 14, the hat portion 15 affects the entire weight of the disk. By decreasing the thickness of the hat portion 15 to the range of 0.5–0.7 of the original thickness, the weight of the disk is decreased by about 11%. This in turn contributes to improved fuel economy of automobiles using the present invention.

According to the present invention, because the thickness of the hat portion 15 is smaller than that of the hub coupling portion 13 and that of the end portion 16, the hat portion 15 can be deformed relatively easily, thereby preventing large stress concentrations being placed on the () weld portion 19, thereby improving the fatigue strength and life of the wheel. Further, due to the decrease in thickness of the hat portion 15, the wheel disk is lightened by about 11%.

Although the present invention has been described with reference to a specific exemplary embodiment, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A disk for an automotive wheel comprising:

a hub coupling portion extending perpendicularly to an axis of the disk;

a curved portion integrally connected with the hub coupling portion and curving radially outwardly and axially inwardly at a first radius;

a hat portion integrally connected with the curved portion and curving radially outwardly and axially inwardly at a second radius greater than the first radius; and an end portion integrally connected with the hat portion and extending axially inwardly;

wherein a thickness of the end portion is smaller than a thickness of the hub coupling portion, and a thickness of the hat portion is smaller than the thickness of the end portion, and wherein a first ratio of the thickness of the end portion to the thickness of the hub coupling portion is in a range of from 0.65 to 0.8, and a second ratio of the thickness of the hat portion to the thickness of the hub coupling portion is in a range of from 0.5 to 0.7.

2. A disk according to claim 1, wherein said first ratio is between 0.71 and 0.74 and said second ratio is between 0.59 and 0.65.

3. A disk according to claim 1, wherein the thickness of the curved portion gradually decreases from a side of the hub coupling portion to a side of the hat portion.

4. A disk for an automotive wheel having a substantially uniform stress distribution, said disk comprising:

a hub coupling portion disposed perpendicular to an axis of said disk and having a first thickness;

a curved portion coupled to said coupling portion and having a thickness gradually decreasing from said first thickness away from said hub coupling portion to a third thickness that is in a range of thickness ratio of 0.5 to 0.7 with respect to said first thickness;

a hat portion coupled to said curved portion and having a thickness that gradually increases to a second thickness away from said curved portion, said second thickness being smaller than said first thickness and being in a range of thickness ratio of 0.65 to 0.8 with respect to said first thickness; and an end portion coupled to said hat portion and having said second thickness.

5. A method for forming a disk having non-uniform thickness for a wheel including a hub coupling portion, a curved portion coupled to said hub coupling portion, a hat portion coupled to said curved portion, and an end portion coupled to said hat portion, said method comprising the steps of:

cutting a circular flat plate from a plate having uniform thickness;

forming said circular flat plate into a disk-shaped product so that said end portion has a thickness greater than a thickness of said hat portion but less than a thickness of said hub coupling portion, wherein a first ratio of the thickness of the end portion to the thickness of the hub coupling portion is in a range of from 0.65 to 0.8, and a second ratio of the thickness of the hat portion to the thickness of the hub coupling portion is in a range of from 0.5 to 0.7; and subjecting said disk-shaped product to cutting in order to form desired holes in said disk-shaped product, thus forming said disk having non-uniform thickness.

6. A method as claimed in claim 5, wherein said forming step includes cold spinning said circular flat plate.

7. A method as claimed in claim 5, wherein said forming step includes oscillation forging said circular flat plate.

8. A method of forming a disk having non-uniform thickness for a wheel including a hub coupling portion, a curved portion coupled to said hub coupling portion, a hat portion coupled to said curved portion, and an end portion coupled to said hat portion, said method comprising the steps of:

preparing a circular flat plate from a plate having non-uniform thickness;

pressing said circular flat plate to form a disk-shaped product so that said end portion has a thickness greater than that of said hat portion but less than a thickness of said hub coupling portion, wherein a first ratio of the thickness of the end portion to the thickness of the hub coupling portion is in a range of from 0.65 to 0.8, and a second ratio of the thickness of the hat portion to the thickness of the hub coupling portion is in a range of from 0.5 to 0.7; and subjecting said disk-shaped product to cutting so that desired holes may be formed therein, thus forming said disk having non-uniform thickness.

\* \* \* \* \*